United States Patent
Esson

(10) Patent No.: US 7,324,013 B2
(45) Date of Patent: Jan. 29, 2008

(54) SAFETY ALARM SYSTEM

(75) Inventor: Earl Edward Esson, Meridian, ID (US)

(73) Assignee: Preco Electronics, Inc., Boise, ID (US)

( * ) Notice: Subject to any disclaimer, the term of this patent is extended or adjusted under 35 U.S.C. 154(b) by 155 days.

(21) Appl. No.: 10/981,033

(22) Filed: Nov. 2, 2004

(65) Prior Publication Data

US 2006/0103541 A1    May 18, 2006

(51) Int. Cl.
*G08G 1/16* (2006.01)

(52) U.S. Cl. ............. 340/903; 340/435; 340/463; 340/471; 340/474

(58) Field of Classification Search ......... 340/463, 340/464, 468, 471, 474, 903, 435
See application file for complete search history.

(56) References Cited

U.S. PATENT DOCUMENTS

| | | | | |
|---|---|---|---|---|
| 4,603,317 A | * | 7/1986 | Gailbreath et al. | 340/463 |
| 5,315,288 A | * | 5/1994 | Coward | 340/463 |
| 5,450,057 A | * | 9/1995 | Watanabe | 340/435 |
| 5,467,072 A | * | 11/1995 | Michael | 340/436 |
| 5,940,347 A | | 8/1999 | Raida et al. | |
| 5,979,586 A | * | 11/1999 | Farmer et al. | 180/274 |
| 6,025,778 A | * | 2/2000 | Dietz et al. | 340/463 |
| 6,151,398 A | | 11/2000 | Norris | |
| 6,268,803 B1 | | 7/2001 | Gunderson et al. | |
| 6,326,887 B1 | * | 12/2001 | Winner et al. | 340/435 |
| 6,606,389 B1 | | 8/2003 | Selfridge et al. | |
| 6,635,612 B1 | | 10/2003 | Norman et al. | |
| 6,678,381 B1 | | 1/2004 | Manabe | |
| 6,894,608 B1 | * | 5/2005 | Gunderson | 340/468 |
| 2001/0043142 A1 | | 11/2001 | Milliken | |
| 2003/0098786 A1 | | 5/2003 | Bishop | |
| 2003/0122659 A1 | * | 7/2003 | Lam | 340/435 |
| 2004/0183659 A1 | * | 9/2004 | Somuah | 340/435 |

FOREIGN PATENT DOCUMENTS

| | | |
|---|---|---|
| EP | 1488956 A | 12/2004 |
| FR | 2722884 A | 1/1996 |

OTHER PUBLICATIONS

R.F. Knapp Company, "Dual Decibel Level Alarm Systems," http://www.rfknappco.com/Radar_System/custom.htm (Sep. 2004).

* cited by examiner

*Primary Examiner*—Brent A. Swarthout
(74) *Attorney, Agent, or Firm*—Townsend and Townsend and Crew LLP

(57) ABSTRACT

A safety alarm system for use on moving vehicles and heavy equipment provides an added level of safety by not only indicating motion, but by adding a distinct audible warning according to a selected sound pattern template when danger is imminent to those in the local area of potential danger. The sound pattern is selected on the basis of signals from various combinations of signals detected from an object detection sensor and an ambient noise level sensor, thereby providing enhanced safety in the work environment.

2 Claims, 3 Drawing Sheets

SAFETY ALARM SYSTEM

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to improving the safety of the workplace, specifically in areas where people are present around large self-propelled moving equipment.

Vehicle back-up alarms have been known to promote safety on work sites for many years. When operating correctly, back-up alarms on vehicles automatically activate when the vehicle is moving in reverse. This provides a warning for those in the area where the vehicle is operating. In some applications, an automatically adjusting alarm is appropriate. An automatically adjusting alarm operates like a back-up alarm. However, instead of simply switching on the output, the unit listens to the ambient noise and adjusts its output to be merely above the prevailing noise floor.

More recently, object detection systems have found application on working vehicles. These systems constantly monitor a specific area so that detection of an object triggers a warning. This warning is typically in the cab of the vehicle and sometimes may trigger a warning outside of the vehicle.

Both the so-called listening alarm and non-listening alarm suffer from shortcomings that limit usefulness. Referring to FIG. 1, a heavy vehicle 4 is depicted while backing up with a backup alarm 12. The sound pressure level (SPL) of the alarm 12 is about 108 dB at a distance of 1 m, which then degrades according to the inverse square law to less than 93 dB at a distance of 6-8 m. However, consider a worker 2 with a jackhammer at a distance of 6 m from the backup alarm 12. Around the worker 2 is a cone of sound from the jackhammer which is at or above 96 dB measured on a 1 m radius. The worker 2 is unlikely to hear the backup alarm, thus putting the worker at risk. A non-listening alarm would not compensate for this deficiency. A listening alarm 12 would compensate for the localized noise by boosting output by about 4 dB to overcome the localized noise, but this boost is inadequate in this environment. Boosting the sound to about 88 dB at worker 2, much less than 96 dB. It is calculated that this type of alarm would have to produce a sound pressure level of 112 dB to be minimally effective.

Known patents in the field include U.S. Pat. Nos. 6,151, 398; 6,678,381; 6,635,612; 6,606,389; 5,940,347; and published U.S. Application No. 2001/00043142. Known manufacturers of alarm systems which have proximity sensors include R.F. Knapp Company. Its online publicity of "DUAL DECIBEL LEVEL ALARM SYSTEMS" found at http://www.rfknappco.com/Radar_System/custom.htm (September 2004) notes an alarm system with object detection which has adjustable alarm output. The Knapp alarm is claimed to change the sound level, but no reference is made to an alternate sound template, that is, a sound pattern of a specific nature, such as a distinctive alarm sound, to provide further intelligence on the nature of the danger.

What is needed is a system that provides industry-recognized warning indications, with increased usefulness in situations of imminent danger while providing for a fail-safe operating mode.

SUMMARY OF THE INVENTION

According to the invention, an object detection system is combined with a controller and a self-adjusting alarm to provide an intelligent movement alarm system with increased safety to persons working around moving vehicles and like heavy equipment. In normal operation, the alarm activates on movement with its output being automatically adjusted based on the ambient noise in the area. However, when an object is detected in the path of the moving equipment, a signal is sent to the alarm controller which causes the output to change to alert those in the area of imminent danger. The use of an object detection system is coupled with an automatically adjusting alarm (referred to as a "listening alarms) such that when an object in a danger zone is detected, the alarm output is maximized (or alternatively the sound template is optimized) regardless of the ambient noise (as compared to a non-listening alarm's higher sound level or alternate sound template). The alarm itself is specifically designed to accommodate the operation of the system. This effect adds more meaning to the alarm sound in that it indicates that not only that moving equipment is working in the area, but there is imminent danger. Various embodiments of this concept include changing the warning sound (or, more generally, the sound template) in various ways to further distinguish the sound from normal (non-detecting) operation. The result is a system that provides industry-recognized warning indications, yet be one that increases the usefulness of the warning in situations of imminent danger while providing for a fail-safe operating mode.

The invention will be better understood by reference to the following detailed description in connection with the accompanying drawings.

DETAILED DESCRIPTION OF SPECIFIC EMBODIMENTS OF THE INVENTION

Figure 1:
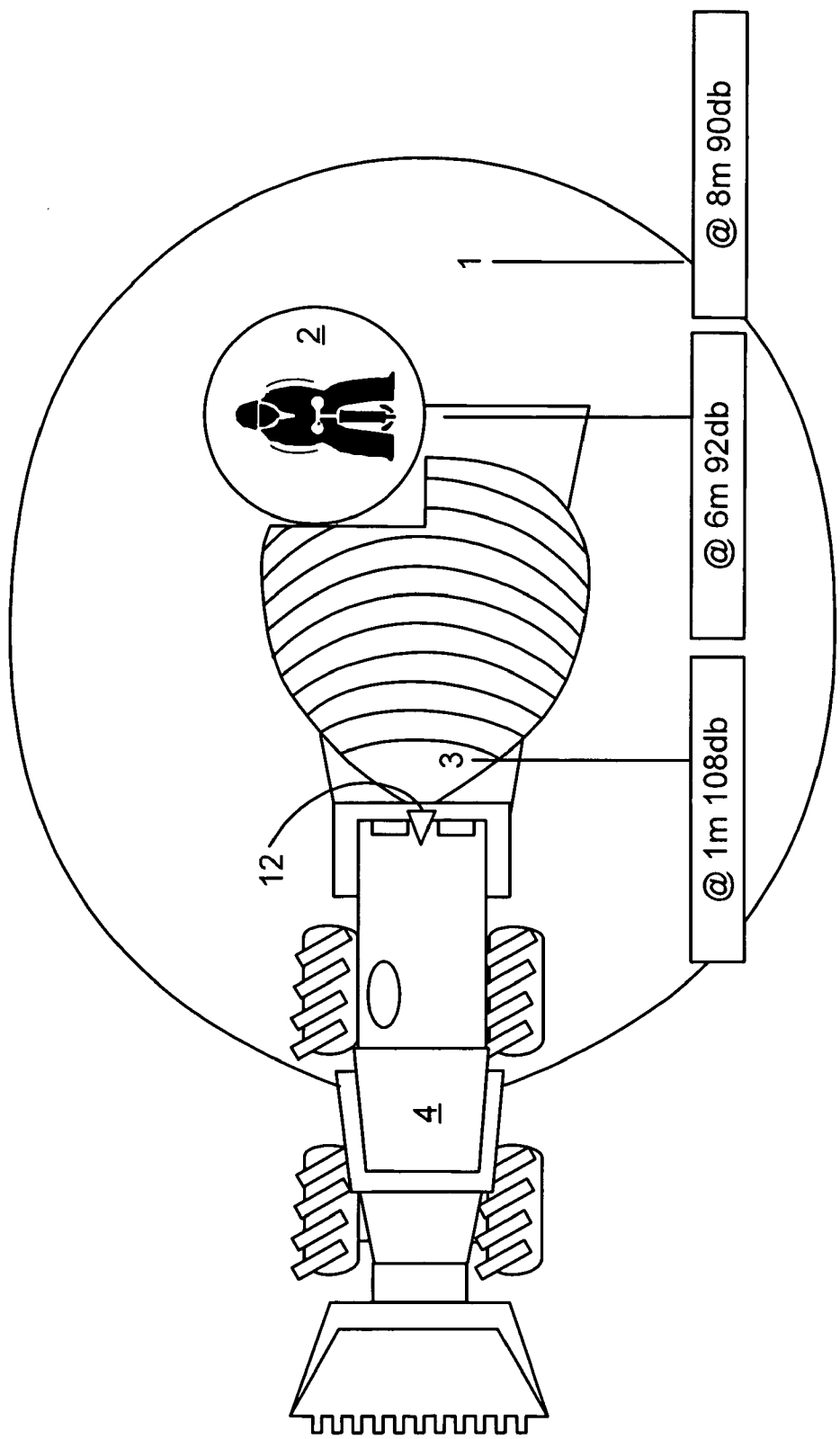
FIG. 1 is an overhead view depicting the environment of heavy equipment to illustrate weaknesses in alarm systems.
Figure 2:
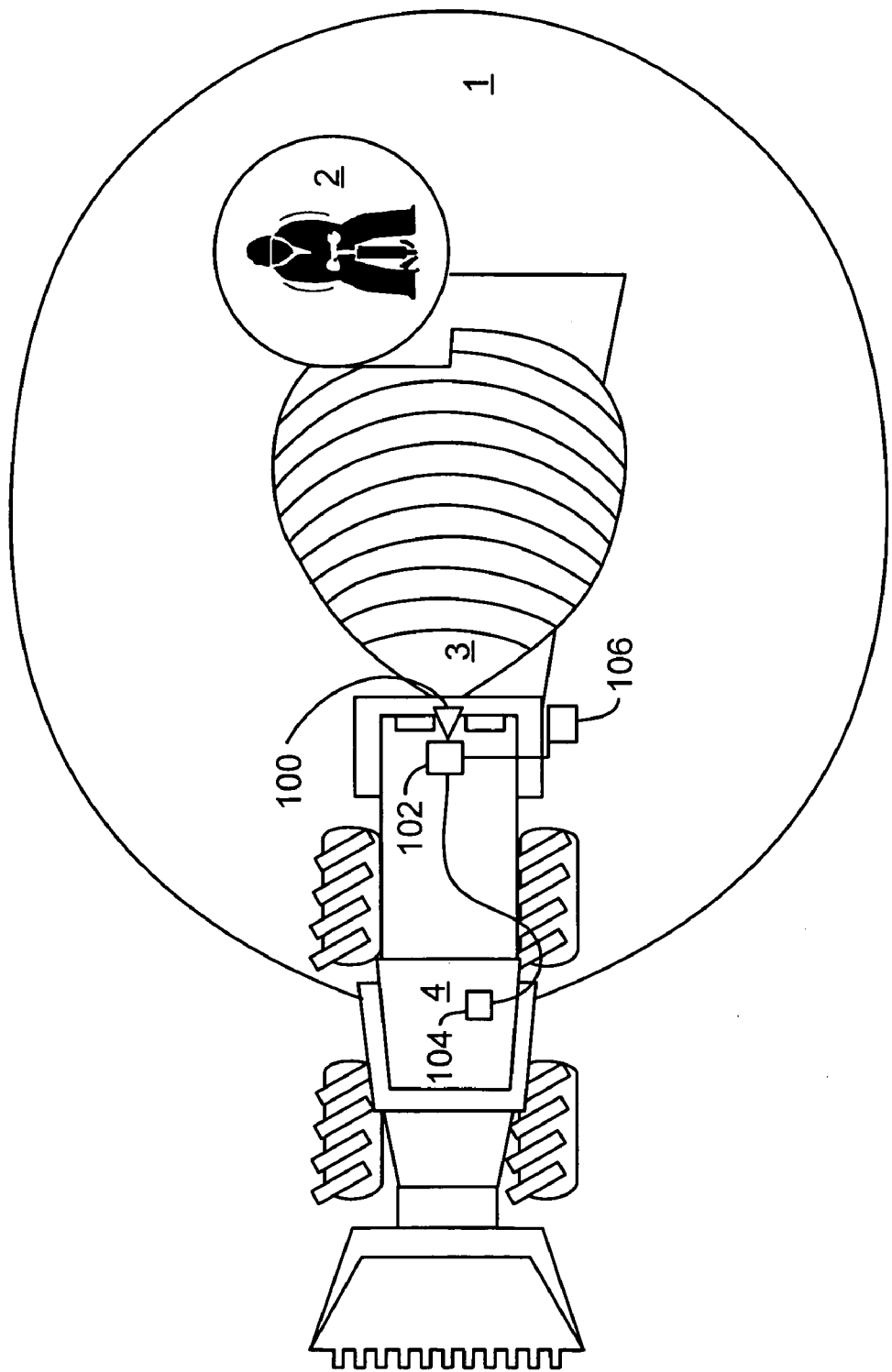
FIG. 2 is an overhead view depicting the environment of heavy equipment with detection to produce an alternative warning alarm according to the invention.

Referring to FIG. 2, a safety alarm system according to the invention comprises a sound transducer 100 coupled to a controller 102 in which is embedded a selection of sound templates that are changed with either a manual override switch 104 or automatic response to an input from a sensor 106 to alert a person in the danger zone. The change in the sound template enables a listener to perceive danger more easily without requiring the substantial boosting of the sound pressure level. For example, tone or pitch change is better than volume change in areas regulated for specific noise limits. Specifically, there is an audible contrast effect (a form of sound template) involving a mixture of variations by volume, pitch, cadence or tone change to alert of imminent danger. This so-called safety alarm system (SAS) sound template/listening alarm concept, particularly the event-cued sound patterns concept, is unique in back-up alarm technology.

Figure 3:
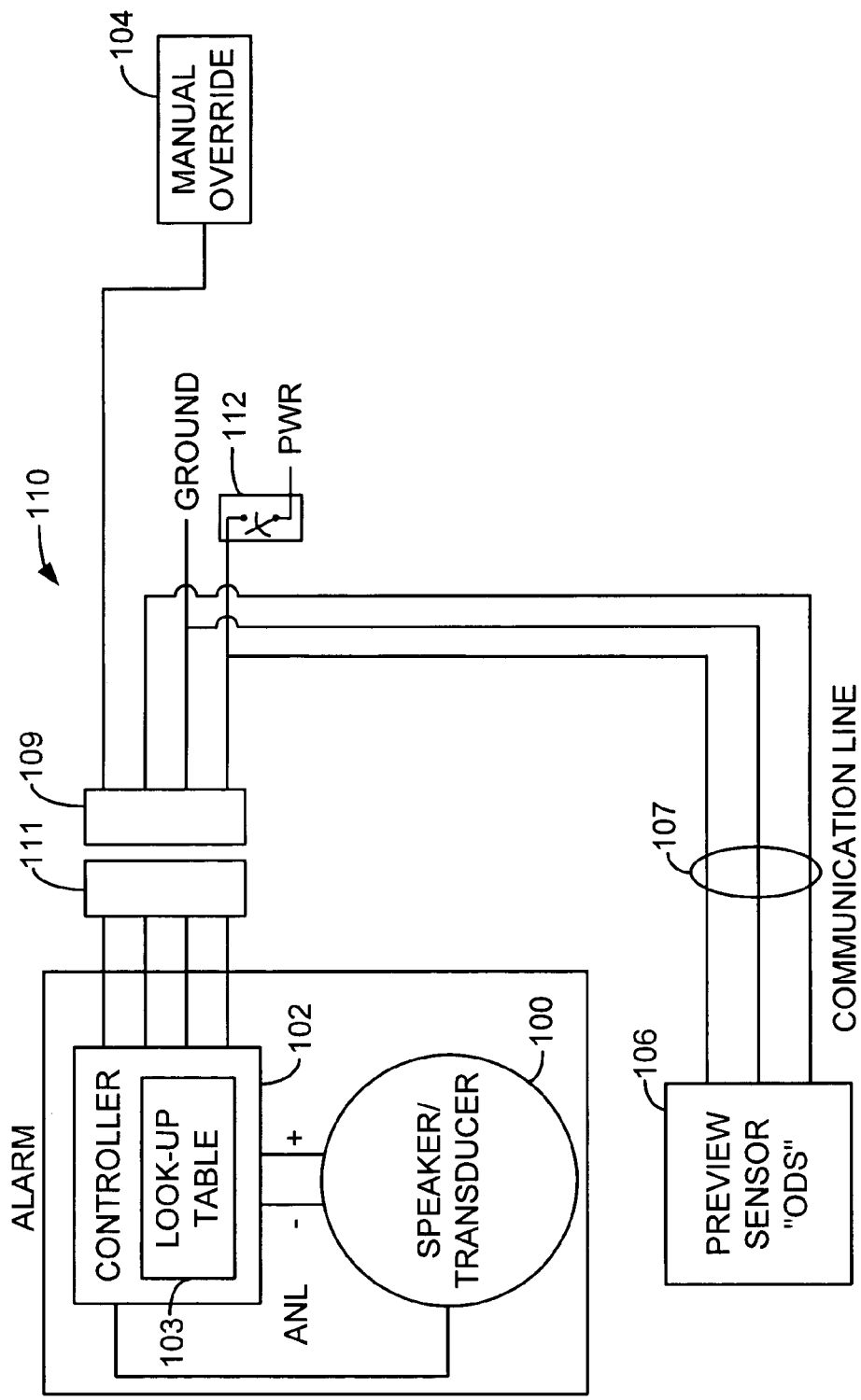
FIG. 3 is a block diagram of a circuit of a controllable alarm according to the invention.

Referring to FIG. 3, a listening alarm structure 110 according to the invention is illustrated. The speaker/sound transducer 100 is capable of supporting a range of sound types suited to alarm sounds (or more generally, the production of sound and the receiving/listening-to sound). It is coupled to the controller 102, which acts as the sound exciter, producing the electrical signals specifying the output sound pattern. In the controller is a lookup table 103 which contains at least two and probably a dozen different sound pattern templates, one of which is selected by the controller 102 to serve as the intended sound pattern.

The controller 102 receives signals from an object detection system (ODS) 106 via ODS communication lines 107 through detachable connector set 109, 111. A power switch 112 coupled to the power source (vehicle battery, not shown) is provided to supply power to the controller 102, the transducer 100 and the ODS 106. Manual override option switch 104 coupled via connector set 109, 111 gives an operator an opportunity to choose the operating mode of an alarm and the type of sound template to be used. An alarm system equipped with a manual override switch, according to the invention can thus be operated in either a listening mode or a non-listening mode, eliminating redundancy of using two separate alarms to achieve both high and low level sound outputs and different sound patterns. Automatic operation without manual override would default to the imbedded sound template contained within the alarm control processor.

In normal operation as a listening alarm, the ambient noise level (ANL) feed back from the transducer 100 via the controller 102 is used to adjust the sound pressure level (SPL) of the transducer 100 above the noise floor. The ODS communication lines 107 pass on detection data of distance and time of an object that comes within the detection zone of the ODS 106. The distance and time data processed by the ODS 106 is transferred to the alarm controller 102 to optimize the warning sound that is produced. The alarm controller 102 uses the inputs from the ODS 106 and also ambient noise level feedback from the transducer 100 or other sensor to produce a preselected warning sound based on the distance, time and ANL data. The incoming sound is typically converted to voltage by movement of a coil in a magnetic field in the transducer 100 for use in characterizing the ANL data. The ODS operation can use light, infrared, sound, radio frequency and or other means of range detection by signal transmission to broadcast a probe signal and detect the report of the signal to calculate the presence of an object and the distance to the object. Once the report is processed, so that distance is acquired and the time or rate of change in distance can be characterized, the ANL, distance and time/rate in change of distance can then be used to trigger the ACP to select the desired/stored programmed sound output matrix of the alarm. The detection information could initiate the following warning example:

Detection at 8 m initiates an assessment of the anl (Step A).

Knowing the spl loss at 8 m, the alarm spl is adjusted for an amount above the anl and compensates for the spl loss over the detected distance (Step B).

The detection sequence is repeated as the vehicle moves. Movement from 8 m to 5 m is timed, and the time elapsed is assessed to yield an approach rate condition (Step C).

The above pulse rate is changed from for example 1 beep per second to 2 beeps per second should the time interval indicate a rapid approach speed (Step D) to invoke a more urgent warning condition while also adjusting for the ambient noise level).

Other sound templates may be invoked, depending upon condition. The following table contains the alarm status, detected condition and the corresponding sound pattern template:

| ALARM STATUS | CONDITION | SOUND TEMPLATE PATTERN/RESPONSE |
|---|---|---|
| NULL | NO MOTION | NULL (ALARM OFF) |
| ACTIVE STATE/ NO DETECTION | IN MOTION, NO DETECTION & ANL BELOW ALARM SPL LOW THRESHOLD | STD 1 Hz WARNING INTERVAL (BEEP-BEEP) AT INITIAL ALARM SPL SETTING |
| ACTIVE STATE/ NO DETECTION | IN MOTION, NO DETECTION & ANL ABOVE ALARM SPL LOW THRESHOLD | STD 1 Hz WARNING INTERVAL, ANL SPL ANALYZED BY THE ALARM CONTROL PROCESSOR (ACP) AND THE ALARM SPL SETTING INCREASED 3–5 dB ABOVE ANL |
| ACTIVE STATE/ DETECTION (DETECT ZONE 1) | IN MOTION, DETECTION @ MAXIMUM OBJECT DETECTION SYSTEM (ODS) RANGE SETTING | STD 1 Hz WARNING INTERVAL, ANL SPL & ODS DISTANCE ANALYZED BY THE ACP AND THE ALARM SPL SETTING INCREASED 3–5 dB ABOVE ANL WITH ODS DISTANCE USED TO COMPENSATE FOR SPL LOSS OVER THE DISTANCE TO THE DETECTED OBJECT |
| ACTIVE STATE/ DETECTION/ WITH CLOSURE TO DETECTED OBJECT (LOW RATE) (DETECT ZONE 2) | IN MOTION, DISTANCE TO DETECTED OBJECT IS REDUCING, BELOW CLOSURE RATE THRESHOLD | STD 1 Hz WARNING INTERVAL, ANL SPL, ODS DISTANCE & TIME ANALYZED BY THE ACP AND THE ALARM SPL SETTING INCREASED 3–5 dB ABOVE ANL WITH ODS DISTANCE USED TO COMPENSATE FOR SPL LOSS OVER THE DISTANCE TO THE DETECTED OBJECT |

-continued

| ALARM STATUS | CONDITION | SOUND TEMPLATE PATTERN/RESPONSE |
|---|---|---|
| ACTIVE STATE/ DETECTION/ WITH CLOSURE TO DETECTED OBJECT (HIGH RATE) (DETECT ZONE 2) | IN MOTION, DISTANCE TO DETECTED OBJECT IS REDUCING, ABOVE CLOSURE RATE THRESHOLD | 2 Hz WARNING INTERVAL, ANL SPL, ODS DISTANCE & TIME ANALYZED BY THE ACP. CLOSURE RATE HIGH CONDITION TRIGGERED AND THE ALARM SPL SETTING INCREASED 3–5 dB ABOVE ANL WITH ODS DISTANCE USED TO COMPENSATE FOR SPL LOSS OVER THE DISTANCE TO THE DETECTED OBJECT + ACP NOW CHANGES TO 2 Hz WARNING INTERVAL |
| ACTIVE STATE/ DETECTION/ WITH CONTINUING CLOSURE TO DETECTED OBJECT (DETECT ZONE 3) | IN MOTION, DISTANCE REDUCING & BELOW CLOSURE RATE | 2 Hz WARNING INTERVAL (UP FROM 1 Hz), ANL & ODS ANALYZED BY THE ACP AS IN PRIOR STATE |
| | IN MOTION, DISTANCE REDUCING & ABOVE CLOSURE RATE | 3 Hz WARNING INTERVAL (UP FROM 2 Hz), ANL & ODS ANALYZED BY THE ACP AS IN PRIOR STATE |
| NEAR FIELD/ DETECTION THRESHOLD (DETECT ZONE 4) | ODS DETECTS DISTANCE TO OBJECT HAS CROSSED THE DISTANCE THRESHOLD AT A RANGE OF 5–10 FEET ( 1–3 M) | 3–5 Hz WARNING INTERVAL (AND OR TONE CHANGE) WITH ADJUSTMENT BY ACP FOR ANL AND SPL LOSS FACTOR. |
| DEPARTURE AWAY FROM DETECTED OBJECT | DISTANCE TO DETECTED OBJECT IS INCREASING | REVERSE IN THE ABOVE STEPPED STATE SOUND PATTERN, WITH RETURN 1 Hz WARNING INTERVAL THAT IS ADJUSTED BY THE ACP FOR ANL AND SPL LOSS FACTOR |

NON-LISTENING ALARM SIMILAR, BUT WITHOUT THE ADDED BENEFIT OF ADJUSTING THE ALARM SPL BASED ON THE AMBIENT NOISE LEVEL. SAS ALARMS WITH OUT AN ALARM CONTROL PROCESSOR WOULD ONLY TOGGLE TO A HIGHER SPL LEVEL.

The above table lists a few representative samples of sound patterns that can be stored in the lookup table and reproduced upon automatic conditions or manual override. Other patterns may also be incorporated as conditions warrant.

The invention has now been explained with reference to specific embodiments. Other embodiments will be evident to those of ordinary skill in the art. It is therefore not intended that the invention be limited, except as indicated by the appended claims.

What is claimed is:

1. A vehicle motion warning backup alarm comprising:
an object detection system for detecting objects of interest including inattentive persons and an ambient sound level sensor for sensing level of interference sound as it appears at the position of the objects of interest;
an alarm sound transducer on the vehicle operative to direct sound from the vehicle toward said objects of interest sufficient to alert an inattentive person in the presence of said interference sound;
sound pattern storage for storing sound pattern templates, including a pattern of sound of an alarm level sufficient to overcome interference sound level at the objects of interest; and
a controller coupled to said object detection system and operative to receive signals from said object detection system representative of information about distance of the objects and persons and said interference sound level, and in response to said signals to override default alarm operation and thereby to select one of said sound pattern templates among at least two sound pattern templates, including at least one of said sound pattern template being correlated to the distance and said interference sound level, and to excite the alarm sound transducer according to said selected sound pattern template to warn away with sufficient sound intensity at a target position of the person to overcome the interference sound level at the position of the object of interest and to warn away the inattentive person.

2. A method for warning inattentive persons that are in the path of a backing vehicle that is in motion comprising:
using a sensor at the vehicle for sensing for objects of interest including the persons and for sensing distance to the objects and level of interference sound as it appears at the position of the objects of interest and for sensing ambient noise levels in a field of motion of the vehicle to produce sensing signals, wherein said sensing signals include ambient noise level signals and motion signals associated with the objects;
conveying said sensing signals to a controller;
in response to said sensing signals, selecting via said controller a sound pattern template, including a pattern of sound of an alarm level sufficient to overcome interference sound levels at the objects of interest, from among at least stored two sound pattern templates; and
exciting an alarm sound transducer according to said selected sound pattern template, selected by said controller appropriate to said motion signals and appropriate to said ambient noise level signals at said objects of interest to produce a sound of a sound level and in a direction appropriate to the sensing signals toward objects and persons in the field of motion of the vehicle such that sufficient warning is given to inattentive persons while reducing excessive noise in other directions.

* * * * *